(12) United States Patent
Stern et al.

(10) Patent No.: US 10,969,655 B2
(45) Date of Patent: *Apr. 6, 2021

(54) CAMERA SYSTEM USING INTERCHANGEABLE FIXED LENSES

(71) Applicant: Tactacam LLC, Caledonia, MN (US)

(72) Inventors: Ben Stern, Holmen, WI (US); Jeff Peel, Decorah, IA (US); Ben Thorud, Holmen, WI (US)

(73) Assignee: Tactacam LLC, Caledonia, MN (US)

( * ) Notice: Subject to any disclaimer, the term of this patent is extended or adjusted under 35 U.S.C. 154(b) by 54 days.

This patent is subject to a terminal disclaimer.

(21) Appl. No.: 16/285,915

(22) Filed: Feb. 26, 2019

(65) Prior Publication Data

US 2019/0294029 A1   Sep. 26, 2019

Related U.S. Application Data

(63) Continuation of application No. 15/593,991, filed on May 12, 2017, now Pat. No. 10,216,065.

(60) Provisional application No. 62/335,843, filed on May 13, 2016.

(51) Int. Cl.
| | | |
|---|---|---|
| *G03B 11/04* | (2021.01) |
| *H04N 5/225* | (2006.01) |
| *H04N 5/76* | (2006.01) |
| *G03B 17/08* | (2021.01) |
| *G03B 17/56* | (2021.01) |
| *H04N 5/77* | (2006.01) |
| *H04N 5/907* | (2006.01) |

(52) U.S. Cl.
CPC ............ *G03B 11/041* (2013.01); *G03B 17/08* (2013.01); *G03B 17/565* (2013.01); *H04N 5/2252* (2013.01); *H04N 5/2253* (2013.01); *H04N 5/2254* (2013.01); *H04N 5/2258* (2013.01); *H04N 5/76* (2013.01); *H04N 5/772* (2013.01); *H04N 5/907* (2013.01)

(58) Field of Classification Search
CPC .............................. G03B 11/041; G03B 17/08
See application file for complete search history.

(56) References Cited

U.S. PATENT DOCUMENTS

| | | | |
|---|---|---|---|
| D181,908 S | 1/1959 | Hertzler | |
| 3,133,140 A | 5/1964 | Winchell | |
| 3,454,323 A | 7/1969 | Dierks | |
| 3,968,504 A * | 7/1976 | Komine | ................... G03B 7/20 396/71 |
| 5,208,624 A * | 5/1993 | MacKay | ................ G03B 11/00 396/530 |

(Continued)

OTHER PUBLICATIONS https://www.abelcine.com/store/Wide-Angle-Adapters, printed May 16, 2017.

(Continued)

*Primary Examiner* — Clayton E. LaBalle
*Assistant Examiner* — Dennis Hancock
(74) *Attorney, Agent, or Firm* — McAndrews, Held & Malloy

(57) ABSTRACT

A camera system is disclosed. The camera system includes a camera that employs interchangeable fixed lenses. By replacing one lens cap with another lens cap, the field of view can be changed since each lens cap has a different fixed lens. The camera can also record images or video in a forward and a backward direction at the same time.

20 Claims, 4 Drawing Sheets

(56) References Cited

U.S. PATENT DOCUMENTS

| | | | |
|---|---|---|---|
| 5,495,676 A | 3/1996 | Chesnut | |
| 6,002,430 A | 12/1999 | McCall | |
| 6,889,006 B2 | 5/2005 | Kobayashi | |
| D529,528 S | 10/2006 | Ross, Jr. | |
| D546,863 S | 7/2007 | Ito | |
| 7,312,820 B2 | 12/2007 | Zimmermann | |
| 7,371,021 B2 | 5/2008 | Ross, Jr. | |
| 7,830,628 B2 | 11/2010 | Schaefer | |
| 8,063,980 B2 | 11/2011 | Ito | |
| D650,821 S | 12/2011 | Verhey | |
| 8,292,523 B2 | 10/2012 | Dowell | |
| 8,656,625 B2 | 2/2014 | Holmberg | |
| 8,687,299 B1 | 4/2014 | Sanford | |
| 8,717,497 B2 | 5/2014 | Holmberg | |
| 8,857,714 B2 | 10/2014 | Benson | |
| 8,908,045 B2 | 12/2014 | Stewart | |
| 8,939,140 B2 | 1/2015 | Mancini | |
| D730,967 S | 6/2015 | O'Neill | |
| 9,167,228 B2 | 10/2015 | Monari | |
| 9,285,659 B2 | 3/2016 | Yokayama | |
| 9,480,326 B2* | 11/2016 | Stephens | F16M 13/00 |
| 9,846,009 B1 | 12/2017 | McDaniels | |
| 10,216,065 B2* | 2/2019 | Stern | G03B 11/041 |
| 2002/0002788 A1 | 1/2002 | Hope | |
| 2002/0093565 A1* | 7/2002 | Watkins | B60R 11/02 |
| | | | 348/148 |
| 2002/0163588 A1* | 11/2002 | Holmberg | A01M 31/00 |
| | | | 348/373 |
| 2004/0135892 A1* | 7/2004 | Maeda | H04N 1/00278 |
| | | | 348/207.2 |
| 2006/0098307 A1 | 5/2006 | Campean | |
| 2008/0037871 A1* | 2/2008 | Sinop | G06K 9/34 |
| | | | 382/173 |
| 2009/0195667 A1 | 8/2009 | Scholfield, Jr. | |
| 2009/0252486 A1 | 10/2009 | Ross, Jr. | |
| 2010/0060747 A1* | 3/2010 | Woodman | H04N 5/232 |
| | | | 348/222.1 |
| 2010/0313462 A1* | 12/2010 | Holmberg | F41G 11/004 |
| | | | 42/124 |
| 2012/0017485 A1* | 1/2012 | Kern | F41A 23/16 |
| | | | 42/94 |
| 2013/0170482 A1 | 7/2013 | Jung | |
| 2013/0340738 A1 | 12/2013 | Mancini | |
| 2014/0104488 A1* | 4/2014 | Samuels | H04N 5/2252 |
| | | | 348/374 |
| 2014/0267721 A1 | 9/2014 | Ster | |
| 2014/0269646 A1 | 9/2014 | Pamasamy | |
| 2016/0069641 A1* | 3/2016 | Kortemeier | F41A 35/02 |
| | | | 206/316.1 |
| 2016/0295172 A1 | 10/2016 | Cuddleback | |
| 2017/0078537 A1* | 3/2017 | Peddecord | H05K 5/06 |
| 2018/0088443 A1* | 3/2018 | Riddiford | G03B 11/041 |
| 2018/0100722 A1* | 4/2018 | McDaniels | F41G 1/383 |

OTHER PUBLICATIONS http://www.cs.mtu.edu/~shene/DigiCam/User-Guide/lens/5700-Otherwide.html, printed May 16, 2017.

http://www.amazon.com/Coolpix-Definition-Optics-Adapter-Cleaning/dp/B00D8SHYVE, printed May 16, 2017.

http://www.alibaba.com/product-detail/ZOMEI-58mm-0-45x-Wide-angle_853050947.html, printed May 16, 2017.

http://www.aliexpress.com/item/xiao-yi-37mm-xiaomi-yi-CPL-Filter-Circular-Polarizer-Lens-Filter-Filter-Adapter-Lens-Cap-for/32353379319.html, printed May 16, 2017.

http://www.aliexpress.com/store/product/ZOMEI-58MM-0-45X-Wide-Angle-Lens-Ultra-Slim-Multi-Coated-AGC-Optical-Glass-Pro-MC/2067022_32623996559.html, printed May 16, 2017.

* cited by examiner

CAMERA SYSTEM USING INTERCHANGEABLE FIXED LENSES

CROSS-REFERENCE TO RELATED APPLICATIONS

The present application is a continuation of U.S. application Ser. No. 15/593,991, filed May 12, 2017, now U.S. Pat. No. 10,216,065, which claims benefit from and priority to U.S. Application No. 62/335,843, filed May 13, 2016. The above-identified applications are incorporated by reference herein in their entirety.

BACKGROUND

In a digital single-lens reflect (DSLR) camera, a single lens with variable magnification is provided. DSLR cameras are typically quite large and heavy and not particularly portable when out in the field. Furthermore, DSLR cameras and in particular, the single variable lens is quite sensitive and not very robust when exposed to the outside elements. Such disadvantages are enhanced by such cameras, especially with the single variable lens being quite expensive.

What is needed is a camera system that can be made smaller, lighter, and less costly and that can be taken outdoors and exposed to the elements without being damaged. What is also needed is a camera system that can provide different magnifications or points of view without the extraordinary expense of a DSLR single variable lens.

BRIEF SUMMARY

Camera systems and methods are provided, substantially as illustrated by and/or described in connection with at least one of the figures, as set forth more completely in the claims.

DETAILED DESCRIPTION

Some embodiments of the present disclosure relate to camera systems and, in particular, camera systems that use interchangeable fixed lenses.

Some embodiments of the present disclosure provide a camera that includes fixed lenses in respective caps that can be interchanged to change the magnification and/or the field of view.

Some embodiments of the present disclosure provide that the camera can be portable and light and can be mounted to a bow, a gun, a weapon, a vehicle, a hat, clothing, etc. The lens cap of the camera can be interchanged with other lens caps that have different respective lenses (e.g., wide angle lens, an intermediate lens, a zoom lens, a fish eye lens, etc.).

Some embodiments of the present disclosure provide that the camera can have different lenses pointed in two different directions to concurrently or simultaneously capture pictures, images, and/or video from the two different directions.

Figure 1A:
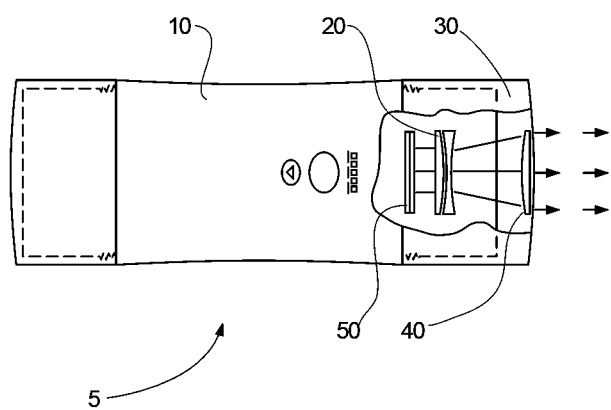
FIG. 1A shows a first embodiment of a camera system according to the present disclosure.
Figure 1B:
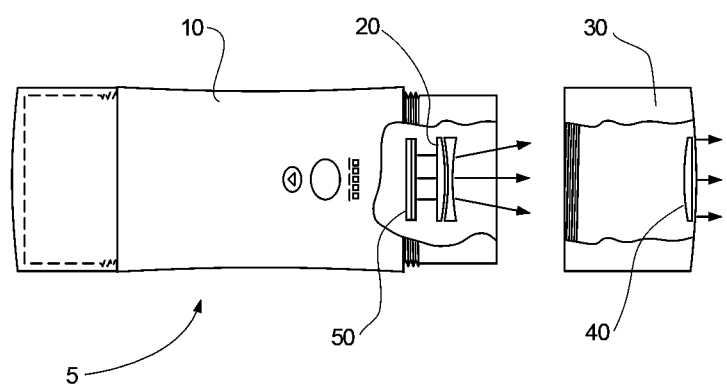
FIG. 1B shows the first embodiment of the camera system with a housing and a cap separated according to the present disclosure.

Referring to FIGS. 1A-B, a first embodiment of a camera 5 is shown. The camera 5 can include, for example, a housing 10 and a lens cap 30. One or both the housing 10 and the lens cap 30 are sealed to be waterproof Thus, the contents of the housing 10 (e.g., circuitry, a battery, an internal lens, an image sensor, etc.) and the contents of the lens cap 30 (e.g., a fixed lens) are sealed and protected from the elements (e.g., precipitation, wind, etc.).

The housing 10 can be configured to house circuitry (see, e.g., some circuitry shown in FIG. 3), a battery (not shown), an internal lens 20, an image sensor 50, and various camera inputs and outputs (e.g., data ports, screens, lights, touch-sensitive displays, buttons, microphones, etc.).

The lens cap 30 can be configured to provide a fixed lens 40 and is configured to be replaceable by other similar lens caps 30 with different fixed lenses 40. For example, a lens cap 30 with an intermediate fixed lens 40 can be replaced with a lens cap 30 with a zoom lens or with a lens cap 30 with a wide angle lens or a fisheye lens. The lens caps 30 with different fixed lenses 40 are interchangeable without compromising image quality or focus.

The lens cap 30 can also be configured to hold the fixed lens 40 at a particular distance from the internal lens 20 of the housing 10 to achieve optimal focus with respect to the image sensor 50. For example, the lens cap 30 can be configured to a preset distance for that particular lens cap 30 with that particular fixed lens 40 such that, when the lens cap 30 is mounted on, screwed on, connected to, and/or secured to the housing 10, the distance from the internal lens 20 of the housing 10 to the fixed lens 40 is set to achieve optimal focus with respect to the image sensor 50.

In operation according to some embodiments, an external image (e.g., light from an object) is received by the fixed lens 40 which directs the image through the lens cap 30 to the internal lens 20 of the housing 10. The internal lens 20 of the housing 10 directs the image to the image sensor 50. The fixed lens 40 and the internal lens 20 work together to focus the image on the image sensor 50. The image sensor 50 converts the received image into an analog or digital image and/or video signal. In some embodiments, the image sensor 50 converts the received image into monochrome or multi-color pixel signals or data that can be further processed by circuitry 100 in the housing 50. The image signal can be further processed, stored, and/or transmitted. In some embodiments, the camera 5 is storing and/or processing images for pictures or images for use in videos. In the case of videos, the camera 5 can include a microphone for capturing sound for playback in the video.

In operation according to some embodiments, the camera 5 can function without or without the lens cap 30. For example, even without the lens cap 30, the housing 10 is still sealed from the elements (e.g., water, dust, etc.). Further, the camera 5 can function to take photos or record video by using the internal lens 20 and the image sensor 50.

By adding (e.g., securing, mounting, etc.) the lens cap 30 to the housing 10, the fixed lens 40 can change the field of view of the scene. For example, if the fixed lens 40 is a fixed zoom lens, then the image of an object, for example, received by the image sensor 50 through the fixed lens 40 and the internal lens 20 is a close up of view of the object.

By replacing the lens cap 30 with a different lens cap 30 with a different fixed lens 40, the field of view of the scene can be modified. For example, if the fixed lens 40 is a wide angle lens, then the image received by the image sensor 50 from the fixed lens 40 and the internal lens 20 is wide angle view of the scene, which might be more stable for a particular scenario.

In some embodiments, the lens cap 30 is configured or set so that when the lens cap 30 is attached to the housing 10, the scene or the object is in focus. Thus, even if different fixed lens 40 in different lens caps require different distances from the internal lens 20 for proper focus on the object or scene, each lens cap can be preset so that, when the lens cap 30 is attached to the housing 10, the proper distance between lenses 20, 40 is achieved to optimize focus. Thus, in some embodiments, there is no further adjustments necessary after the lens cap 30 has been attached to (e.g., screwed on) the housing 10.

Some embodiments contemplate that a camera kit will have multiple lens caps 30, each lens cap 30 having a different fixed lens 40 for a different field of view (e.g., wide angle, close up, intermediate, spherical, fisheye, etc.). By merely switching lens caps 30, different fields of view for different scenarios can be effected by the different fixed lenses 40. Lower cost and ease of installation and use can be effected by such fixed lens replacement lens caps 30. Further, since both the lens cap 30 and the housing 10 are sealed, such a camera 5 can be useful in outdoor or underwater settings. In addition, since the lens caps 30 are focused just by attaching the lens caps 30 to the housing 10 even though each lens cap 30 has a different fixed lens 40, different fields of view can be achieved easily and quickly without having to check whether the replacement lens cap with the fixed lens 40 is in focus.

Some embodiments provide that, when protecting the image sensor 50 with an internal lens 20, a more controlled focus is achieved. Also smudges or dust on the front of the camera body have less of an impact on image quality. The weight and size of the camera can be more compact then larger DSLR cameras on the market.

Some embodiments contemplate that the camera 5 can be attached to a weapon or a toy (e.g., a remote-controlled toy) such as a gun or a bow, for example. In capturing video off of a gun or a bow, the camera 5 can be set up with a zoom lens facing forward. This set up can provide optimal video of the subject. After the shot, the camera 5 can be removed from the gun and outfitted with a wide lens instead of pulling out a second camera. Video can then be captured of the recovery and the surroundings. In addition, some embodiments provide that pictures can be taken during video. Further, some embodiments contemplate that the camera 5 include software and/or apparatus configurations to steady the picture and/or video being taken and/or stored whilst the camera 5 is being moved (e.g., while the user is walking or scanning) or shaken (e.g., during the recoil of a gun).

Some embodiments contemplate that the camera 5 can be attached to a vehicle such as a car, a skateboard, an aircraft, or a watercraft, for example. When capturing video out of the car, the camera can be set up with a medium zoom lens facing forward. The camera can also be set up with a wide lens filming the driver. This set up can provide optimal video of the road, driver, and passengers.

Figure 2A:
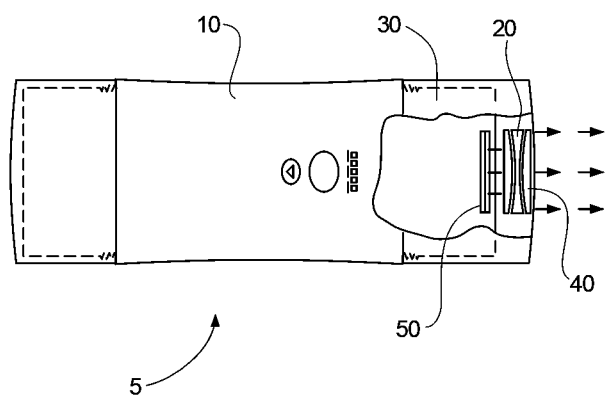
FIG. 2A shows a second embodiment of a camera system according to the present disclosure.
Figure 2B:
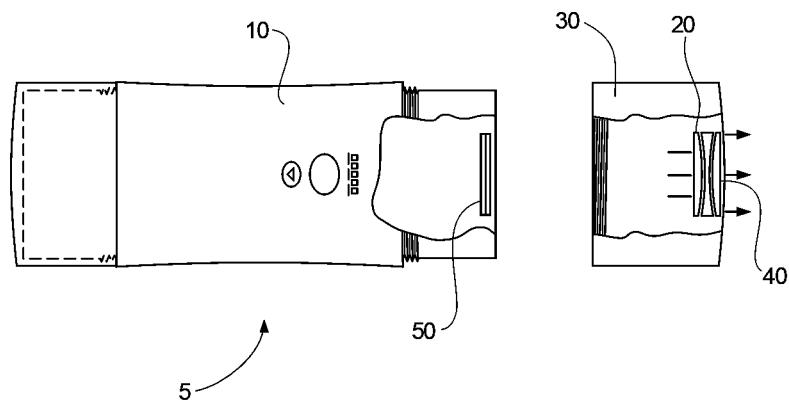
FIG. 2B shows the second embodiment of the camera system with the housing and the cap separated according to the present disclosure.

FIGS. 2A-B shows another embodiment of the camera 5 according to the present disclosure. The embodiment shown in FIGS. 2A-B is similar to the embodiment shown in FIGS. 1A-B except that the lens cap 30 houses the internal lens 20 and the fixed lens 40. Since the fixed lens 40 and the internal lens 20 are both in the lens cap 30, the distance between the lenses 20, 40 can be set in the lens cap 30. In other aspects, the camera system 5 in FIGS. 2A-B can be used in a similar fashion as the camera system in FIGS. 1A-B.

Figure 3A:
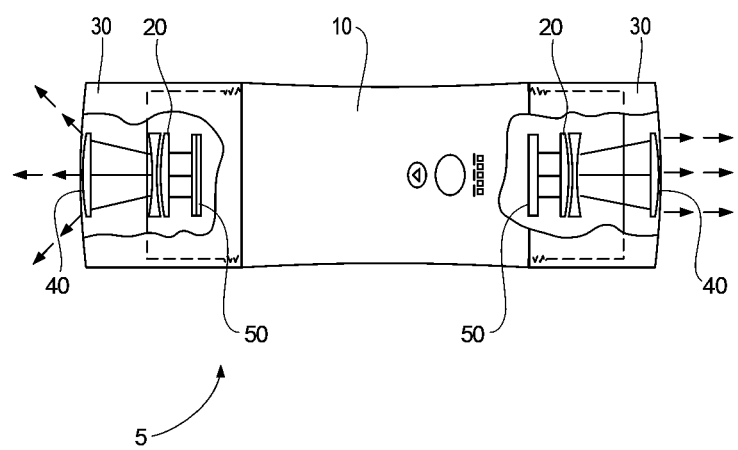
FIG. 3A shows a third embodiment of a camera system according to the present disclosure.
Figure 3B:
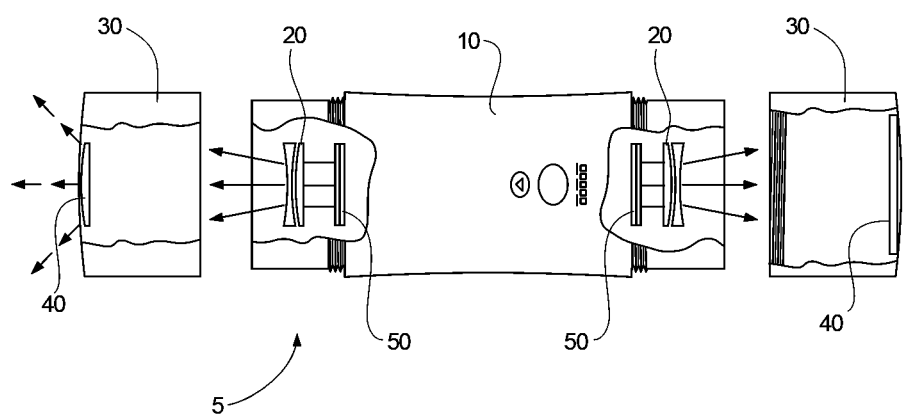
FIG. 3B shows the third embodiment of the camera system with the housing and the caps separated according to the present disclosure.

FIGS. 3A-B shows another embodiment of the camera 5 according to the present disclosure. The embodiment shown in FIGS. 3A-B is similar to the embodiment shown in FIGS. 1A-B except that the camera 50 can record images and/or video from two directions (e.g., a front direction and a back direction). However, as in FIGS. 1A-B, the lens caps 30 each have fixed lenses 40 and can be replaced or interchanged with other lens caps 30 with different fixed lenses 40.

In some embodiments, the camera 5 can take pictures or videos in two different directions simultaneously. The camera 5 can also take pictures or videos from only one side if so configured. During simultaneous recording of pictures or videos, the camera 5 can time stamp each picture and/or video so that the pictures or videos can be synchronized, for example, during playback. In some embodiments, the time stamping is not needed if the pictures or videos are combined as a streaming input from the image sensors 50. Some embodiments contemplate that even if combined as a streaming input, the different videos can be separated and edited during playback. Some embodiments contemplate that the playback be capable of switching between the two videos or that the two videos be played back concurrently (e.g., dual screens, picture-in-picture, etc.)

Some embodiments contemplate that the camera 5 is attached to a weapon or a toy (e.g., a remote-controlled toy) such as a gun or a bow, for example. When capturing video off of a gun or a bow, for example, the camera can be set up with a zoom lens facing forward and a wide-angle lens facing backward. This set up can provide optimal video of the shot and the shooter.

Some embodiments contemplate that the camera 5 is mounted on a vehicle such as a car, a skateboard, an aircraft, or a watercraft, for example. When capturing video out of the car, for example, the camera 5 can be set up with a zoom lens facing forward and a wide-angle lens facing backward. This set up can provide optimal video of the road, driver, and passengers.

Some embodiments contemplate that the camera 5 is mounted on a skateboard, for example. When capturing video while skateboarding, the camera 5 can be set up with a fisheye lens facing forward and a fisheye lens facing backward. This set up can provide optimal video of the road, the skate park, and the skater.

Some embodiments contemplate that the camera 5 is mounted on a watercraft such as a jet ski, for example. When capturing video of a jet ski, the camera 5 can be set up with a wide-angle lens facing forward and a wide-angle facing backward. This set up can provide optimal video of the water, the surroundings, and the driver.

Figure 4:
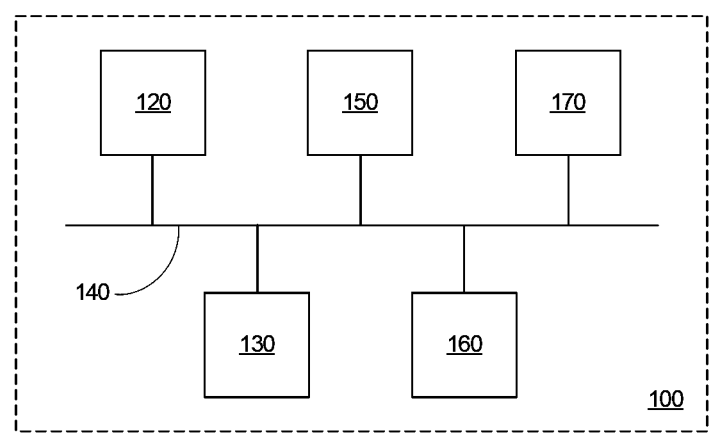
FIG. 4 shows an embodiment of some of the circuitry of the camera system according to the present disclosure.

FIG. 4 shows some of the circuitry 100 that housed by the housing 10. The circuitry 100 can include, for example, a processor 120, a memory 130, inputs 150, outputs 160, and a transceiver 170. The various components of the circuitry 100 can be connected by one or more buses 140. The circuitry 100 can be powered by one or more batteries (e.g., rechargeable batteries) that are not shown. The circuitry 100 can also include recharging circuitry when the circuitry 100 is connected to a power source (e.g., another battery, a wall outlet, a charger, etc.).

The processor 120 can include, for example, one or more of the following: a central processing unit, a digital signal processor, a signal conditioner, a controller, a microcontroller, an encoder, a decoder, a communication processor, a graphics processor, etc. The processor 120 can also include, for example, analog-to-digital converters and/or digital-to-analog converters.

The memory 130 can include, for example, one or more of the following: computer storage, volatile memory, non-volatile memory, rand access memory (RAM), read only memory (ROM, flash memory, stolid state memory, semiconductor memory, electromagnetic memory, optical memory, hard drive, memory stick, memory card, etc. In some embodiments, the memory 130 can include memory that is removable such as a memory card for transferring memory contents from the camera 5 to a computer or a smart phone, for example. The same memory card or a different memory card can subsequently be inserted back into the camera 5. The memory 130 can, for example, store video, pictures, information, settings, and other data. The memory 130 can also store the initial, intermediate, and/or final results of calculations or algorithms performed by the processor 120. The memory 130 can also store code, software, and/or instructions that can be executed and/or run by the processor 120.

Inputs 150 can include, for example, one or more of the following: buttons, switches, touch-sensitive displays, microphones, etc. that form part of the housing 10. The inputs 150 can also include, for example, the image sensor 50.

Outputs 160 can include, for example, one or more of the following: touch-sensitive displays, screens, lights, light emitting diodes (LEDs), liquid crystal displays (LCDs), speakers, lasers, etc.

The transceiver 170 can include one or more transceivers that are configured for wired and wireless communication. For example, the transceiver 170 can be configured to be connected to a cable or wire such as an Ethernet cable, a digital subscriber line (DSL), an optical cable, etc. The transceiver 170 can also be configured to connect to one or more antennas for wireless communication such as cellular communication, WiFi communication, IEEE 802.11-compliant communication, Bluetooth communication, WiMax communication, multiple-input-multiple-output (MIMO) communication, radio communication, etc. In some embodiments, the transceiver 170 can be configured for direct communication (e.g., wired and/or wireless communication) with another device (e.g., a transceiver 170 in another camera 5, a storage device, etc.), or indirect communication (e.g., via a base station or an access point) with another device. In some embodiments, the transceiver 170 can include, for example, one or more of the following: a signal conditioner, an upconverter, a downconverter, etc.

In operation according to some embodiments, an external image (e.g., light from an object) is received by the fixed lens 40 which directs the image through the lens cap 30 to the internal lens 20 of the housing 10. The internal lens 20 of the housing 10 directs the image to the image sensor 50. When a button, for example, of the input 150 is actuated, the image sensor 50 converts the received image into an analog or digital image signal. In some embodiments, the image sensor 50 converts the received image into monochrome or multi-color pixel signals or data. The button can be used to start storing images and/or videos. Further, the same button (e.g., actuated multiple times) or a different button of the inputs 150 can be used toggle the modes between image mode and video mode. Further, the same button or a different button of the inputs 150 can be used to start or stop the storing and processing of images and/or videos by the circuitry 100. In some embodiments, when in video mode, sounds are converted into analog or digital sound signals by a microphone of the inputs 150 which can be synchronized with the video.

In some embodiments, the image signal is sent from the image sensor 50, which can be part of the input 150 and processed by the processor 120. The processor 120 can store the image signal in the memory 150. In some embodiments, the processor 120 can receive analog signals from the image sensor 50 and convert the analog signal into a digital signal such as pixel data that is stored in the memory 130. In some embodiments, the processor 120 can receive the image signal from the image sensor 50 and convert that image signal into an image (e.g., a picture) format or file or a video format or file. In some embodiments, when the camera 5 is in video mode, sounds are converted into sound signals by a microphone of the inputs 150, which are then combined (e.g., synchronized) by the processor 120, with the video images received from the image sensor 50 before being stored in the memory 150.

In some embodiments, the memory 150 includes a removable memory such as a memory card that can be removed from the camera 5 and inserted into a computer, for example, to view the images or to play the videos. In some embodiments, the output 160 or the transceiver 170 includes a data port so that a computer, for example, can be connected to the camera 5 and the images and/or videos can be downloaded or streamed to the computer for storing and/or viewing. In some embodiments, the transceiver 170 can be used to transmit the images and/or videos to a computer over a wired connection (e.g., an Ethernet link) and/or a wireless connection (e.g., a Bluetooth link). The images and/or videos can be streamed or downloaded to a computer, for example.

In some embodiments, the outputs 160 can include a display, or a display can be connected to the output 160 or the transceiver 170. The processor 120, which can include a graphic processor and/or a graphic accelerator, can be used with the display to show the images and/or the videos stored in the memory 130. The outputs 160 can also include, for example, a speaker to play back sound in the stored video.

The present method and/or system can be realized in hardware, software, or a combination of hardware and software. The present methods and/or systems can be realized in a centralized fashion in at least one computing system, or in a distributed fashion where different elements are spread across several interconnected computing systems. Any kind of computing system or other apparatus adapted for carrying out the methods described herein is suited. A typical combination of hardware and software can be a general-purpose computing system with a program or other code that, when being loaded and executed, controls the computing system such that it carries out the methods described herein. Another typical implementation can include an application specific integrated circuit or chip. Some implementations can include a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes can be made and equivalents can be substituted without departing from the scope of the present method and/or system. In addition, many modifications can be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A camera, comprising:
   a housing including an image sensor; and
   a plurality of lens caps, each lens cap including a different fixed lens,
   wherein one of the lens caps is mounted on the housing for a first field of view,
   wherein the one lens cap can be replaced with another lens cap for a second field of view,
   wherein one or both of the housing and the lens caps are sealed so that water or dust cannot get inside, and
   wherein the one lens cap can be replaced with the another lens cap for the second field of view while maintaining focus on a target.

2. The camera of claim 1, wherein the image sensor is operable to receive one or more images.

3. The camera of claim 2, wherein the one or more images are used for one or more pictures or one or more videos.

4. The camera of claim 1, wherein the lens cap comprises one or more lenses.

5. The camera of claim 4, wherein the lens cap and the image sensor are used to receive one or more images.

6. The camera of claim 5, wherein the one or more images are used for one or more pictures or one or more videos.

7. The camera of claim 1, wherein the housing is operable as a camera with and without the lens cap.

8. The camera of claim 1, wherein the camera is mounted on a weapon or a vehicle.

9. The camera of claim 1, wherein the camera is wearable.

10. The camera of claim 1, wherein the plurality of lens caps comprises one or more of a wide angle lens, an intermediate lens, a zoom lens, and a fish eye lens.

11. The camera of claim 1, wherein the housing provides one or more touch-sensitive displays.

12. The camera of claim 1, wherein the housing provides one or more user interfaces comprising one or more buttons.

13. The camera of claim 1, wherein the housing provides one or more user interfaces that are operable to change between an image mode and a video mode.

14. The camera of claim 1, wherein the housing provides one or more data ports, one or more lights, or one or more microphones.

15. The camera of claim 1, wherein the housing provides one or both of a transceiver and an antenna for wireless communication.

16. The camera of claim 1, wherein the housing provides one or both of a transceiver and a data port for wired communication.

17. A camera, comprising:
    a housing including an image sensor; and
    a plurality of lens caps, each lens cap including a different fixed lens,
    wherein one of the lens caps is mounted on the housing for a first field of view,
    wherein the one lens cap can be replaced with another lens cap for a second field of view,
    wherein one or both of the housing and the lens caps are sealed so that water or dust cannot get inside,
    wherein a preset distance of a fixed lens of the one lens cap when the one lens cap is mounted on the housing is different from a preset distance of a different fixed lens of the other lens cap when the other lens cap is mounted on the housing instead of the one lens cap, and
    wherein a focus on a target is maintained even though the one lens cap is replaced by the other lens cap with a different fixed lens and a different field of view.

18. A camera, comprising:
    a housing including an image sensor and an internal lens; and
    a plurality of lens caps, each lens cap including a different fixed lens,
    wherein one of the lens caps is mounted on the housing for a first field of view,
    wherein the one lens cap can be replaced with another lens cap for a second field of view,
    wherein a preset distance with respect to the internal lens and a fixed lens of the one lens cap when the one lens cap is mounted on the housing is different from a preset distance with respect to the internal lens and a different fixed lens of the other lens cap when the other lens cap is mounted on the housing instead of the one lens cap, and
    wherein a focus on a target is maintained even after the replacing the one lens cap with the other lens cap.

19. The camera according to claim 17,
    wherein the camera is wearable, or
    wherein the camera is mounted on a weapon or a vehicle.

20. The camera according to claim 18,
    wherein the camera is wearable, or
    wherein the camera is mounted on a weapon or a vehicle.

* * * * *